US005634256A

United States Patent [19]
Fritschi

[11] Patent Number: 5,634,256
[45] Date of Patent: Jun. 3, 1997

[54] PROCESS FOR PRODUCING A THERMALLY INSULATED FLASK

[75] Inventor: Isidor Fritschi, Andelfingen, Switzerland

[73] Assignee: Sigg AG, Switzerland

[21] Appl. No.: 447,454

[22] Filed: May 23, 1995

[30] Foreign Application Priority Data

May 24, 1994 [CH] Switzerland .................. 01590/94

[51] Int. Cl.$^6$ .................................................. B21D 39/00
[52] U.S. Cl. .................... 29/455.1; 220/425; 215/12.1
[58] Field of Search ............................ 29/455.1, 773;
138/148; 220/420, 421, 425, 445, 446, 447, 469; 215/12.1, 13.1

[56] References Cited

U.S. PATENT DOCUMENTS

| 2,322,488 | 6/1943 | Uecker | 29/455.1 |
| 2,695,719 | 11/1954 | Faris | 215/13.1 |
| 3,347,403 | 10/1967 | Lehman | 220/446 |
| 3,863,794 | 2/1975 | Hata | 220/421 |
| 4,850,496 | 7/1989 | Rudell et al. | 220/425 |
| 4,856,174 | 8/1989 | Ishizaki et al. | 29/455.1 |

FOREIGN PATENT DOCUMENTS 4-341694 11/1992 Japan .................................. 220/425

Primary Examiner—David P. Bryant
Attorney, Agent, or Firm—Speckman, Pauley & Fejer

[57] ABSTRACT

A thermally insulating flask having two containers of flow-pressed aluminum, wherein an inner container is placed inside and at a distance from an outer container. The inner container forms a flask neck at the top of the inner container, which is connected in an air-tight manner with the outer container. Both containers are connected at the top by a material of low thermal conductivity, for example chrome-nickel steel, in an air-tight and rigid manner. The connecting piece can be constructed from a composite-plated chrome-nickel steel laminate, in which the aluminum layer has been removed by a lathe, leaving two collar rims, to allow welding to the aluminum containers, while the remaining chrome-nickel steel layer forms the mechanical connection which has low thermal conductivity.

4 Claims, 4 Drawing Sheets

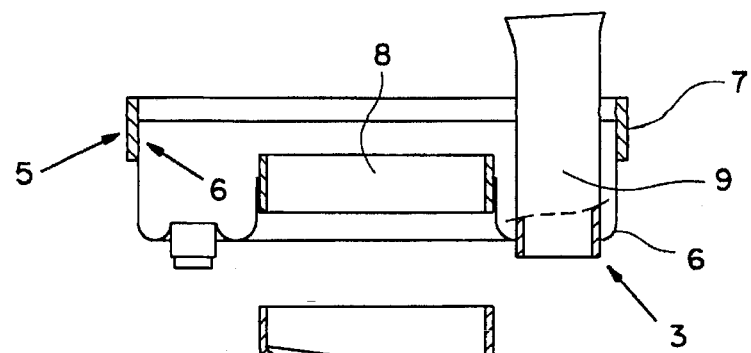
FIG. 1
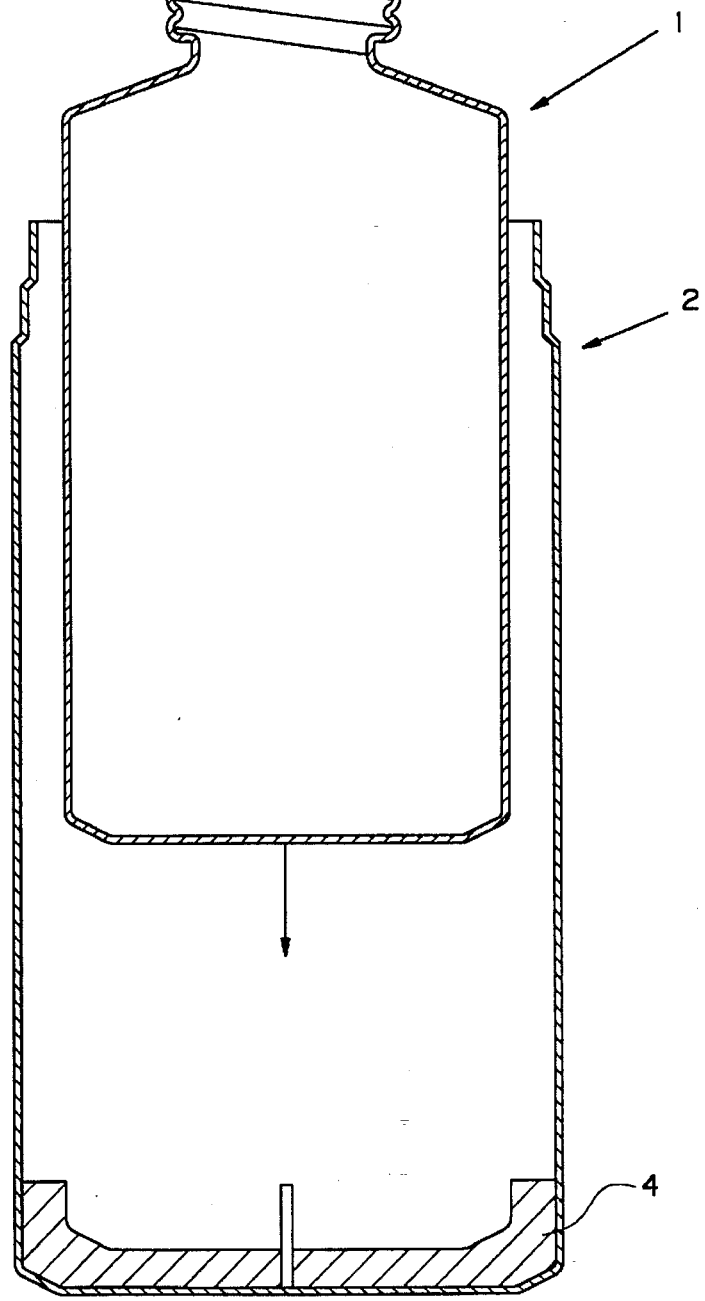

PROCESS FOR PRODUCING A THERMALLY INSULATED FLASK

BACKGROUND OF THE INVENTION

1. Field of the Invention

This invention relates to a thermally insulated flask primarily intended for use outdoors, and made of two containers, where one of the containers is placed inside the other. The outer container is preferably made of aluminum and the inner container forms a neck at the top, which inner container is connected at the top with the outer container with a material of poor thermal conductivity in an airtight and rigid manner. This invention further relates to a process for producing such a thermally insulated flask.

2. Description of Prior Art

Thermos flasks are known which include a flask of a material with good thermal insulating properties for receiving the liquid, or made of double-walled glass, as well as a jacket of plastic enclosing the flask for protection and aesthetics.

A satisfactory insulating effect is achieved with double-walled flasks of chrome-nickel steel, because chrome-nickel steel has a low thermal conductivity coefficient of approximately 14 W/(mK) at 20° C. For production reasons it is necessary to weld the individual chrome-nickel steel flasks together lengthwise. Two such flasks, one placed inside the other at a small distance, are welded together at the top of the flask. The evacuation of the air or the gas between the two flasks results in a considerable improvement of the insulating capability. Flasks with a double wall and a good vacuum in the space between the double walls increase the insulating effect by a factor of 4 to 9, compared with non-evacuated flasks. To obtain a vacuum, the flasks, which are placed one inside the other, are welded together in a vacuum chamber, or, the gas in the hollow chamber is pumped out through a specially installed small tube leading into the chamber, and the small tube is welded shut to be vacuum-tight.

However, such flasks have a number of disadvantages. For one, such flasks are relatively heavy, because chrome-nickel steel has a density of approximately 7.9 g/cm$^3$, and furthermore, chrome-nickel steel per se is an expensive material. Further the production, which includes welding chrome-nickel steel together, is relatively difficult, elaborate and expensive.

Today, increasingly higher demands are made on thermally insulating flasks. Thermally insulating flasks, which make it possible to maintain a sufficient amount of a liquid dependably at a customary serving temperature for at least some hours, are demanded for the outdoors, for example by mountain bikers, mountain climbers, skiers, hunters and other sportsmen, as well as workers whose jobs take them outdoors. Such flasks furthermore should not be unnecessarily heavy and, of course, should be affordable. These last two requirements in particular are not satisfactorily met by conventional chrome-nickel steel flasks.

SUMMARY OF THE INVENTION

It is therefore one object of the present invention to provide a thermally insulating flask having a thermal insulating capability similar to that of purely chrome-nickel steel flasks, but lighter and simpler and more cost-effective to manufacture.

It is another object of this invention to provide a process for manufacturing such flasks.

These objects are achieved by a thermally insulating flask in which an inner container is positioned within an outer container and forms a hollow space between the inner container and the outer container. A connecting piece sealingly secures the inner container to the outer container.

A process for manufacturing such thermally insulated flasks includes positioning one container inside the other container, soldering the tops of the containers together with a connecting piece, and evacuating the gas from the chamber formed between the containers.

BRIEF DESCRIPTION OF THE DRAWINGS

Examples of such flasks, and a process for manufacturing such flasks, are shown and described in conjunction with the drawings, wherein:

FIG. 1 is a partial cross-sectional view of the two aluminum containers of a flask and the connecting piece prior to assembly, according to one preferred embodiment of this invention;

DESCRIPTION OF PREFERRED EMBODIMENTS

Figure 2:
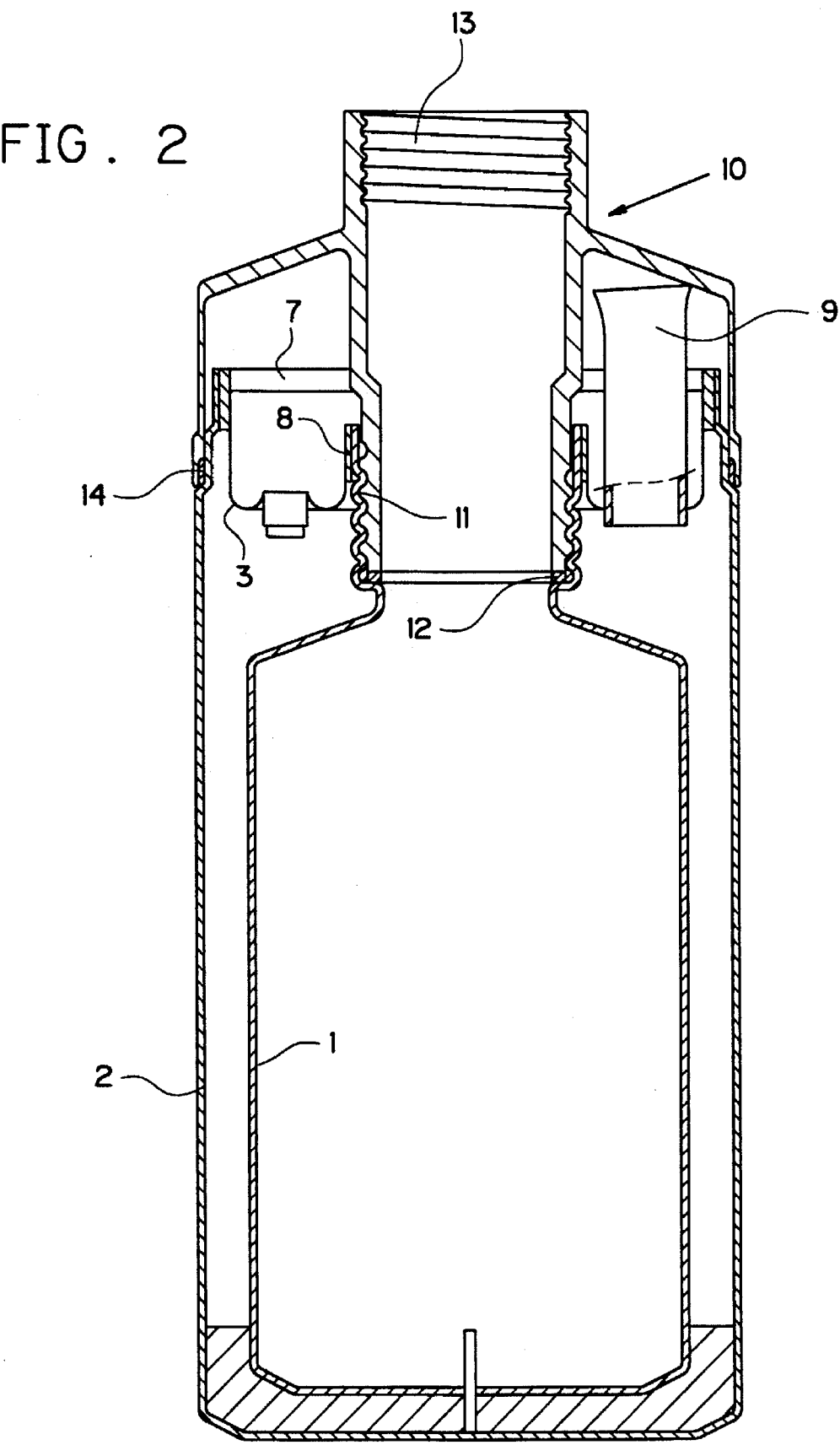
FIG. 2 is a partial cross-sectional view of the assembled flask with a lid portion according to another preferred embodiment of this invention.

The individual components of the flask which are relevant for the invention are shown in longitudinal section in FIG. 1. The flask comprises an inner container 1 which determines the actual volume of the flask, and an outer container 2 which forms a hollow chamber between the outer container 2 and the container 1. The two containers 1, 2 can be connected rigidly and air-tight in such a way that the inner container is immovably held in the outer container 2 under all conditions of use by a connecting piece 3. With the thermally insulating flask in accordance with one preferred embodiment of this invention, at least the outer container 2 is made of aluminum, while the inner container 1 can be selectively made of aluminum or chrome-nickel steel, for example of stainless steel.

In the preferred embodiment shown in FIG. 1, both containers 1 and 2 are made of aluminum. This may be surprising, since aluminum with its thermal conductivity coefficient of 209 W/(mk) at 20° C. is known as a good thermal conductor. In its pure form aluminum has approximately 57% of the thermal conducting capability of copper. However, aluminum is employed here because it is much more cost-effective in comparison with chrome-nickel steel, for example, and such containers can be manufactured very simply, extremely rapidly and cost-effectively by a flow-pressure process. In such process, the aluminum is pressed cold, but under a great pressure, into the desired shape; because of the great pressure, the aluminum "flows", so to speak.

It is one object of this invention to employ these advantages of aluminum and, in spite of its good thermal conductivity, to insulate the inner container 1 optimally from the outer container 2. For this purpose, the inner container 1 is placed into the outer container 2 as indicated by the arrow at the bottom of the inner container 1. A spacer 4 of thermally insulating material, which provides solid support for the inner container 1, can be located at the bottom of the outer container 2. Such a spacer can comprise, for example, two stamped sheet steel pieces of chrome-nickel steel placed inside each other in the shape of a cross, so that the outer container 2 only touches the edges of the chrome-nickel sheet steel pieces 4 and thus allows very little thermal flow between the bottoms of the aluminum containers 1, 2. In place of a cross of chrome-nickel sheet steel pieces, however, a spacer 4 made of cork or another thermally insulating material, for example a ceramic material, can be used. It is also possible to eliminate the spacer 4, particularly if the container 1 is fastened at the top to assure sufficient stability for keeping the container 1 in place.

The upper connection between the two containers 1, 2 is relatively important. While such connection assures a high degree of stability and maintains the inner container 1 securely in the outer container 2, even in a filled state of the flask, if the flask falls to the ground horizontally, for example, the connection also permits only minimal thermal flow between the two containers 1, 2. This is achieved by a connecting piece constructed of a material of low thermal conductivity. According to one preferred embodiment of this invention, this material is chrome-nickel steel, for example stainless steel in accordance with DIN 1.4301.

However, there is a problem associated with firmly connecting chrome nickel steel to the aluminum containers 1, 2. This problem is solved with the thermally insulating flask according to this invention in that the connecting piece 3 is used which first, as a blank, is constructed from a laminate of aluminum and chrome-nickel steel. Suitable layer thicknesses are approximately 0.75 mm for the aluminum layer, while the stainless steel layer is produced with a thickness of approximately 0.35 mm. The connection between the two materials is achieved by composite plating. In the process, the two materials are rolled together in a known manner at a high temperature between 150° C. to 430° C. under high pressure, so that their volume shrinks to about 80%. Such laminates are used in various types in many technical applications and have already proven themselves over many years. Incidentally, they are 100% vacuum-proof.

According to one preferred embodiment of this invention, a laminate is needed having a layer 5 of aluminum and a layer 6 of chrome-nickel steel. This laminate is worked into a connecting piece 3. First the flat composite-plated laminate is given a U-ring shape by metal molding and/or a deep drawing process, wherein the aluminum layer 5 comes to lie on the outside of the connecting piece 3. Then, the aluminum layer 5 is completely removed, except for two collars 7, 8. This can be done by mechanical cutting, such as by turning on a lathe or milling. A small tube 9 is soldered or welded in an air-tight manner into the bottom of the U-ring-shaped connecting piece 3. A small copper tube 9 is preferably used. The small copper tube 9 is inserted into a pre-drilled hole in the bottom of the connecting piece 3 and can easily by soldered or welded to the chrome-nickel steel. On the inside of the connecting piece 3, the chrome-nickel steel layer can be turned down on a lathe by a few millimeters on the outside of the termination of the inner opening, so that the aluminum layer is exposed there. Thus, the mouth of the flask forms an edge or collar 8 of pure aluminum, which makes its adaptation to the use of different closures easier. The same applies to the outer edge or collar 7 of the connecting piece 3. The chrome-nickel steel layer on the inside of the edge of the collar 7 is turned down on a lathe by a few millimeters, so that a pure aluminum edge is created, which eases the attachment of a closure.

After the inner container 1 has been placed into the outer container 2, the connecting piece 3 is inserted between the two container 1, 2 openings. In this way the aluminum containers 1, 2 only touch the aluminum collars 7, 8 on the connecting piece 3. Such purely aluminum-to-aluminum connections are welded in a manner known to those skilled in the art, for example by a melting-welding process such as laser welding, electron beam or arc welding. Such an aluminum weld has been used in many applications over time. The welding of the connecting piece 3 to the two aluminum containers 1, 2, forms a hollow space between the two containers 1, 2. A thermal flow between the two aluminum containers 1, 2 takes place only through the enclosed air and the material bridge between the containers. Further, the material bridge is comprised exclusively of chrome-nickel steel, which has a low thermal conductivity which is less by a factor of 15 than the thermal conductivity of aluminum.

The gas is now preferably evacuated from the interior of the hollow chamber formed between the containers 1, 2. For this purpose the gas is aspirated through the small copper tube 9 by a vacuum pump until an insulating vacuum of approximately $10^{-3}$ mbar has been achieved. The small copper tube 9 is closed off vacuum-tight by cold welding, for example it is squeezed together under great pressure near the bottom of the connecting piece 3 and cut off.

Experience has shown that at such low pressures outgassing occurs in aluminum, in which substances such as nitrogen, oxygen and hydrogen are released. This outgassing is accelerated if the material is brought to a temperature of approximately 200° C. The outgassed substances can be captured or bonded to a large extent by an absorption tablet (known as a gettering tablet in vacuum technology), which had previously been inserted into the hollow chamber between the containers 1, 2. Such absorption tablets are known to those skilled in the art of high vacuum technology and are either brought to temperatures between 300° C. and 400° C. by heating, where they become effective, or they are inductively activated. Outgassing itself is also accelerated by heating. The crystal lattice of the absorption tablet is then capable of bonding and absorbing N, O and H, so that these substances remain captured even after cooling of the absorption tablet and therefore can no longer convey heat from one aluminum container 1 to the other container 2.

According to another preferred embodiment of the method of this invention, welding together the containers 1, 2 with the connecting piece 3 can be performed in a vacuum chamber and, thus, the subsequent evacuation of the gas from the intermediate space can be omitted. In such embodiment, a small tube 9 is also no longer required.

A completed, assembled thermally insulating flask is shown in longitudinal section in FIG. 2. A cover element 10 constructed of plastic or metal has been screwed above the cold-welded stub of the small copper tube 9. The mouth of the inner container 1 has an interior thread 11, which the exterior thread at the bottom of the cover element 10 engages. A sealing ring 12 is preferably positioned at the very bottom of the cover element 10 and seals the cover element 10 against the interior of the inner container 1. An inner thread 13 is provided on the upper portion of the cover element 10. The inner thread 13 is used for screwing in a closure plug of a material which has a poor thermal conductivity, not shown here, which, when inserted, extends down to the sealing ring 12, so that with the flask closed, the liquid is completely and exclusively enclosed in material of poor thermal conductivity. In order to assure good sealing of the outer container 2 with respect to the outside of the cover element 10, a sealing ring 14 is preferably positioned between the lower rim of the cover element 10 and the collar of the outer container 2. The sealing ring 14 assures that moisture cannot get into the space under the cover element 10 and therefore the formation of condensation water in the cover element 10 is prevented.

Figure 3:
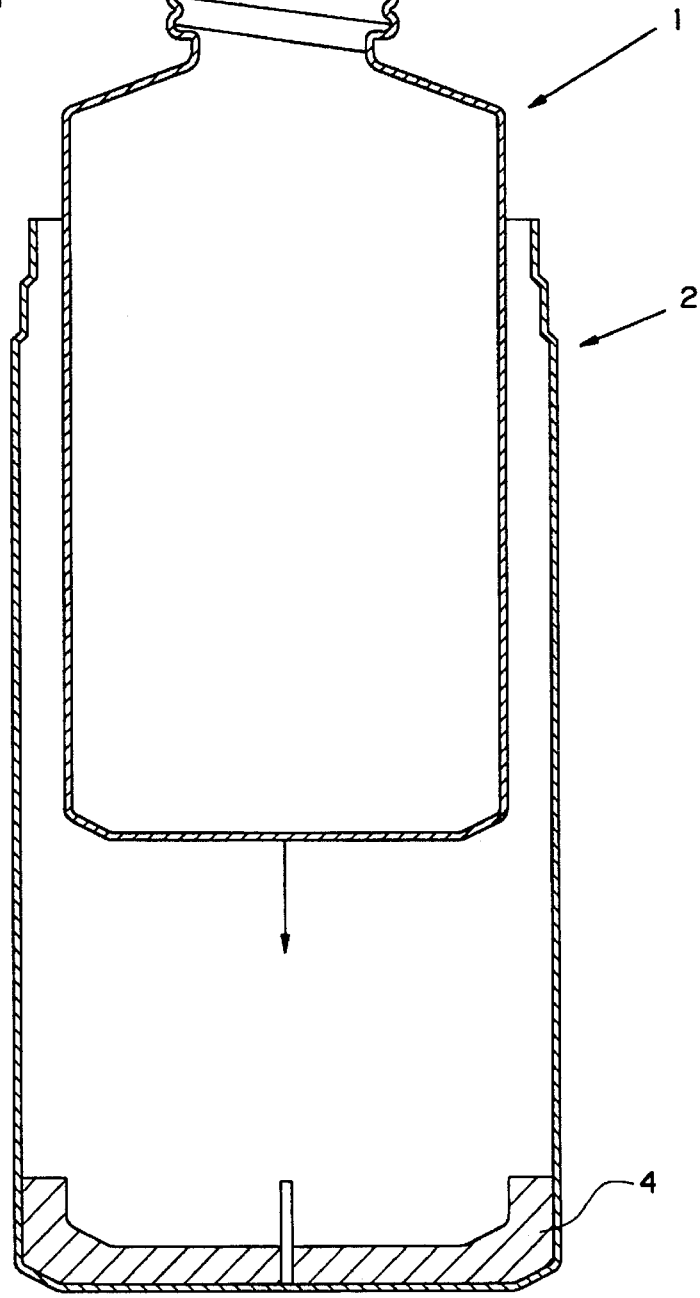
FIG. 3 is a partial cross-sectional view of the two containers of the flak, as well as the connecting piece, prior to assembly.

FIG. 3 represents another preferred embodiment of this invention in which the outer container 2 comprises flow-pressed aluminum in order to make use of the striking advantages of the much more cost-effective manufacture and processing of aluminum, while the inner container 1 which receives the liquid comprises stainless steel. Stainless steel for the inner container 1 is better accepted by the buyers and users of such a flask, because stainless steel is already known from the kitchen for its qualities in connection with food preparation and its easy cleaning. With an inner container 1 of stainless steel there is no longer a need for a collar of aluminum on the inside of the connecting piece 3, because the connecting piece 3 of chrome-nickel steel can be welded together directly with the stainless steel container 1. Thus, the aluminum layer is completely eliminated, except for the collar 7 used for welding with the outer container 2 of aluminum, from the connecting piece 3 which was initially composite-plated of aluminum and chrome-nickel steel. It may be possible for producing the connecting piece 3 to plate blanks in the desired shape, which then need to be merely molded into the correct shape. It is also possible to mold a laminate in the correct shape and then to remove the aluminum layer which is not needed by milling or cutting by lathe.

According to another embodiment of this invention, the connecting piece 3 of a material which has poor thermal conductivity is connected to the containers in an air-tight manner by an adhesive. In such embodiment the containers can preferably comprise aluminum, or the inner container can be selectively made of stainless steel. If an adhesive is used, it is, of course, no longer necessary to use a connecting piece constructed of a composite-plated laminate. The evacuation of the gas in the intermediate space between the containers 1, 2 can take place either by gluing the containers 1, 2 in the interior of a vacuum chamber, or by evacuating the gas via the small tube 9.

Figure 4:
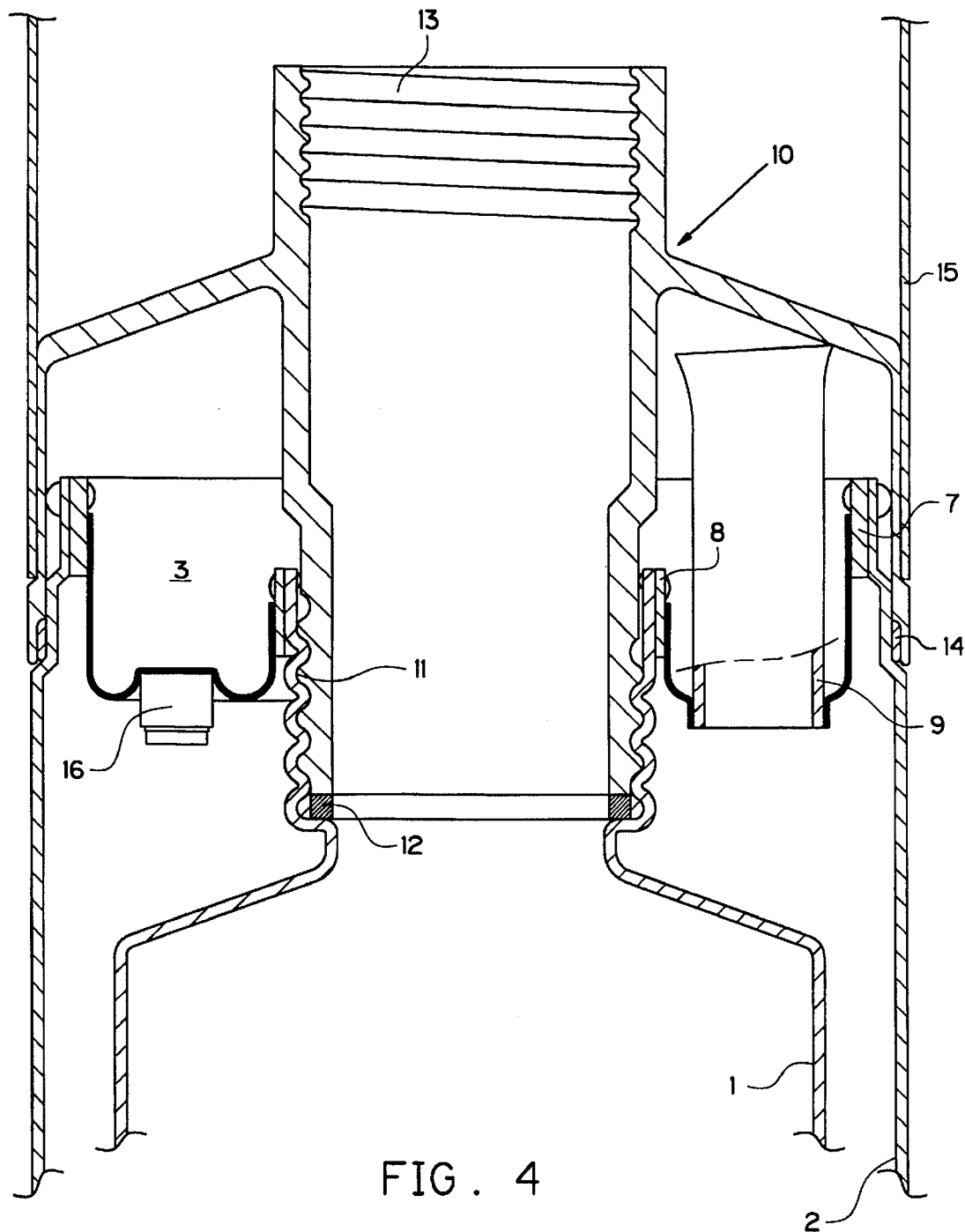
FIG. 4 is a partial cross-sectional enlarged view of the assembled flask, according to another preferred embodiment of this invention.

FIG. 4 shows the cover element 10 and the mouths of the two containers 1, 2 as well as the connecting piece 3 in an enlarged view. The two collars 7 and 8, each comprising a piece of an aluminum layer, previously plated on the connecting piece 3 which otherwise comprises only chrome-nickel steel, are clearly visible. The two collars 7 and 8 are welded to the inner container 1 and the outer container 2. In the flask shown in FIG. 4, the air and the gas generated by the outgassing of the surfaces of the intermediate space have been evacuated through a small tube 9, which was cold-welded afterwards. Outgassing is aided, as already mentioned, by a gettering tablet 16, which captures remaining molecules and is attached to the connecting piece 3. To cover the stub of the small tube 9 which had been created and to form a mouth of the flask for a suitable closure, a cover element 10 has been screwed on the inner container 1. The inner container 1 has an inner thread 11 in the area of the mouth of its neck. A sealing ring 12 has been inserted at the bottom and seals the cover element 10 against the flask contents. The cover element 10 is also sealed on the outside by a sealing ring 14, as has already been described. A closure plug of a suitable material of poor thermal conductivity can be inserted into the inner thread 13 of the cover element 10 and extend down to the sealing ring 12. A cover lid 15 can be placed on the outside over the cover element 10 and can be used as a drinking cup.

The present flask can be produced at a fraction of the cost of a conventional, purely stainless steel flask for the same purpose. In a preferred embodiment which comprises an inner and outer container of aluminum the production costs are less by more than a factor of 10. Because of the material, the finished flask is considerably lighter than a chrome-nickel steel flask, which is particularly important for athletes. Because of its good thermal insulation it can be used on hot days for keeping and taking along cool drinks and in the same way during cold weather for taking along hot drinks or bouillon. In addition, because of its outer surface of aluminum this flask has the advantage of being easy to coat or screen-print, which is not always possible with conventional chrome-nickel steel flasks. Furthermore, the production of the required aluminum containers is very efficient, because production of such a container can be done in fractions of a second because of the flow-pressing method used.

I claim:

1. A process for manufacturing a thermally insulated flask comprising:

positioning a first container (1) within a second container (2), the second container (2) comprising aluminum which was one of flow-pressed cold and deep-drawn, the first container (1) forming a neck having an opening, the second container (2) having an opening at the top of the second container (2), securing the top of the first container (1) with respect to the second container (2) with a connecting piece (3), the connecting piece (3) comprising a composite-plated laminate and having an aluminum layer (5) and a low thermal conductivity layer (6), a first portion of the aluminum layer removed from the connecting piece (3) leaving a second portion of the aluminum layer on a first rim and a second rim for connecting the connecting piece (3) to the first container (1) and the second container (2), respectively, evacuating the gas present in an intermediate space between the first container (1) and the second container (2) through a small metal tube (9) soldered in a vacuum-tight manner to the connecting piece (3), and closing the small metal tube (9) by cold welding.

2. A process in accordance with claim 1, further comprising positioning an absorber tablet (16) into a space between the first container (1) and the second container (2), and heating the flask at a temperature between about 300° C. to about 400° C. whereby outgassed substances are captured by the absorber tablet (16).

3. A process for producing a thermally insulated flask comprising:

positioning a first container (1) within a second container (2) comprising aluminum which was one of flow-pressed cold and deep-drawn, the first container (1) forming a neck having an opening, the second container (2) having an opening at the top of the second container (2), and securing the top of the first container (1) with respect to the second container (2) with a connecting piece (3) in a vacuum chamber, the connecting piece (3) comprising a composite-plated laminate and having an aluminum layer (5) and a low thermal conductivity layer (6), a first portion of the aluminum layer removed from the connecting piece (3) leaving a second portion of the aluminum layer on a first rim and a second rim for connecting the connecting piece (3) to the first container (1) and the second container (2), respectively.

4. A process in accordance with claim 3, further comprising positioning an absorber tablet (16) into a space between the first container (1) and the second container (2), and heating the flask at a temperature between about 300° C. to about 400° C. whereby outgassed substances are captured by the absorber tablet (16).

* * * * *